US008779533B2

(12) United States Patent
Feyh et al.

(10) Patent No.: US 8,779,533 B2
(45) Date of Patent: Jul. 15, 2014

(54) MEMS WITH SINGLE USE VALVE AND METHOD OF OPERATION

(75) Inventors: Ando Feyh, Palo Alto, CA (US); Po-Jui Chen, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 13/180,954

(22) Filed: Jul. 12, 2011

(65) Prior Publication Data

US 2013/0015536 A1 Jan. 17, 2013

(51) Int. Cl.
*H01L 29/84* (2006.01)

(52) U.S. Cl.
USPC ........... 257/415; 257/418; 257/419; 257/420; 257/E21.613; 257/E29.324; 438/54

(58) Field of Classification Search
USPC .......... 257/414, 415, 418, 419, 420, E21.613, 257/E29.324; 438/50, 52, 53, 54
See application file for complete search history.

(56) References Cited

U.S. PATENT DOCUMENTS

| | | | |
|---|---|---|---|
| 7,470,003 B2 * | 12/2008 | Silverbrook | 347/61 |
| 7,625,773 B2 | 12/2009 | Lutz et al. | |
| 2004/0090495 A1 * | 5/2004 | Delametter et al. | 347/56 |

FOREIGN PATENT DOCUMENTS

| | | |
|---|---|---|
| EP | 2119505 A1 | 11/2009 |
| WO | 2009066237 A2 | 5/2009 |
| WO | 2011062471 A2 | 5/2011 |

OTHER PUBLICATIONS

International Search Report and Written Opinion in corresponding PCT Application (i.e., PCT/US2012/046211), completed Sep. 26, 2012 (9 pages).
Hung et al., "Silicide-Based Release of High Aspect-Ratio Microstructures," Dept. of EECS, University of California at Berkeley, IEEE MEMS 2010, pp. 120-123, © 2010 IEEE, USA (4 pages).

* cited by examiner

*Primary Examiner* — Su Kim
(74) *Attorney, Agent, or Firm* — Maginot, Moore & Beck

(57) ABSTRACT

In one embodiment, a method of opening a passageway to a cavity includes providing a donor portion, forming a heating element adjacent to the donor portion, forming a first sacrificial slab abutting the donor portion, wherein the donor portion and the sacrificial slab are a shrinkable pair, forming a first cavity, a portion of the first cavity bounded by the first sacrificial slab, generating heat with the heating element, forming a first reduced volume slab from the first sacrificial slab using the generated heat and the donor portion, and forming a passageway to the first cavity by forming the first reduced volume slab.

20 Claims, 4 Drawing Sheets

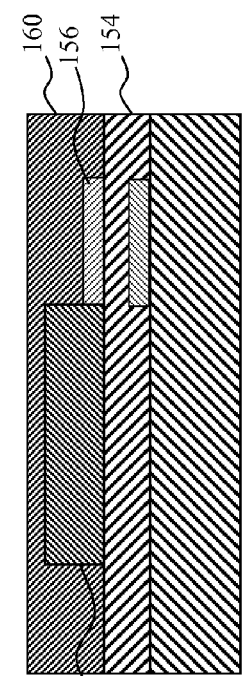
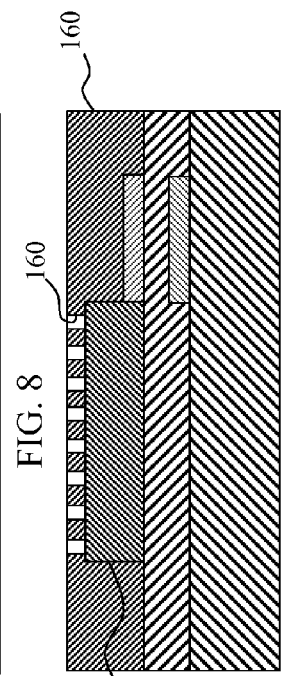
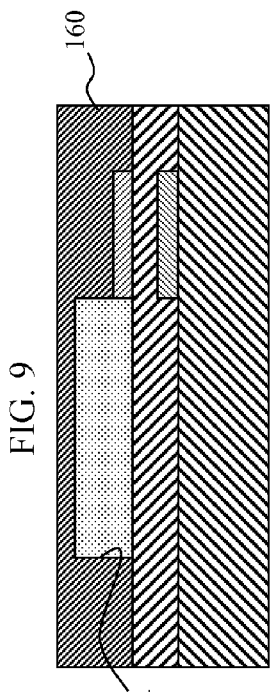
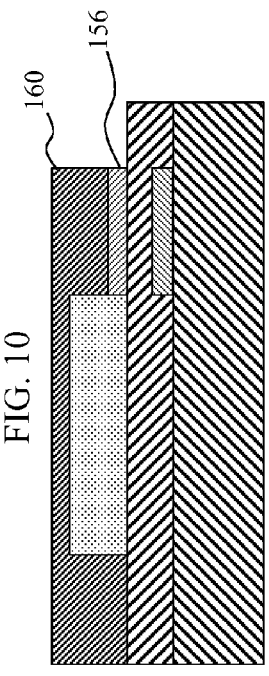
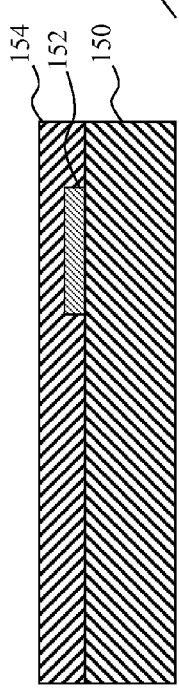
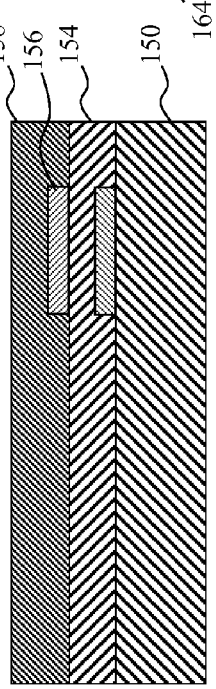
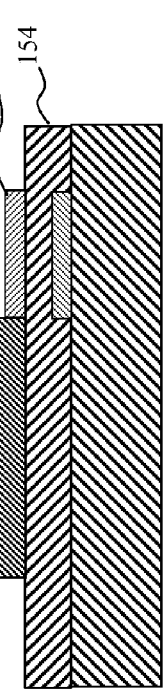
FIG. 4  FIG. 5  FIG. 6  FIG. 7  FIG. 8  FIG. 9  FIG. 10  FIG. 11

MEMS WITH SINGLE USE VALVE AND METHOD OF OPERATION

FIELD OF THE INVENTION

This invention relates to micromechanical electrical system (MEMS) devices or semiconductor devices.

BACKGROUND

Semiconductor substrates are used in a wide variety of applications. One such application is in the formation of micromechanical electrical system (MEMS) devices. As the need for increased complexity of the physical structure of MEMS devices has increased, a number of different shaping processes have been developed. Two major categories of shaping processes are bulk micromachining of silicon and surface micromachining. Each of these processes has unique benefits and capabilities.

Typically, the processes used in shaping a substrate allow for highly complex shapes to be defined in the plane of the substrate. These processes also allow for moving parts to be manufactured. One group of known components that incorporate moving parts are valves. One example of a micromachined valve is a thermally actuated microminiature valve having a seat substrate that is fabricated using a first semiconductor wafer. The seat substrate includes a flow via and a raised valve seat structure that surrounds the flow via at a front surface. A second semiconductor wafer is patterned to include a central armature for alignment with the raised valve seat structure and to further include an array of legs extending from the central armature. Each leg has two metallic layers, with each of the two metals having substantially different coefficients of thermal expansion. As the legs are heated, the difference in thermal expansion of the two metallic layers causes the legs to arch, thereby displacing the central armature relative to the flow via.

Whenever moving parts interact with other parts as in the valve described above, increased precision in manufacturing is required. The minimum achievable size for a particular component thus becomes a function of the uncertainties in semiconductor fabrication processes. Moreover, as the manufacturing processes become more complex for a given device, the failure rate of the device increases thereby increasing the cost of the devices. Additionally, mechanically actuated valves can be opened inadvertently, e.g., due to an external shock.

In some applications, a valve must be operated only once during the lifetime of the device. By way of example, a device configured to provide a predetermined dose of a substance to a patient may incorporate a stored dose within a chamber sealed by a valve which is opened to administer the dose. In sensor devices, the sensor may be positioned within an isolated chamber so as to extend the life of the device. When the device is then ready to be used, the chamber is opened to the environment that is to be monitored. In order to ensure that the single use valves will operate when needed, however, substantially the same precision when manufacturing the single use valve as is required when manufacturing a valve that is operated multiple times. Accordingly, size limitations, manufacturing complexities, and expense for a single use valve, i.e., a valve that is to simply be opened once and thereafter remain open, is on a par with size limitations, manufacturing complexities, and expense multiple use valves.

What is needed, therefore, is a single use valve that can be easily incorporated into a MEMS device or semiconductor device. A further need exists for a single use valve that allows for increased manufacturing tolerances without increased failure rates compared to known single use valves. A single use valve which does not include the same size limitations, manufacturing complexities, and expense as other single use valves would be beneficial. a single use valve which is not operated by mechanically moving parts would also be beneficial.

SUMMARY

In one embodiment, a method of opening a passageway to a cavity includes providing a donor portion, forming a heating element adjacent to the donor portion, forming a first sacrificial slab abutting the donor portion, wherein the donor portion and the sacrificial slab are a shrinkable pair, forming a first cavity, a portion of the first cavity bounded by the first sacrificial slab, generating heat with the heating element, forming a first reduced volume slab from the first sacrificial slab using the generated heat and the donor portion, and forming a passageway to the first cavity by forming the first reduced volume slab.

In a further embodiment, a ready-to-use MEMS device includes a silicon based donor portion, a first cavity defined by a first boundary in the MEMS device, a first silicide forming metal portion abutting the silicon based donor portion, the first silicide forming metal portion forming a portion of the first boundary, and a heating element adjacent to the first silicide forming metal portion.

In another embodiment, a method of opening a passageway to a cavity includes providing a silicon donor portion, forming a heating element adjacent to the silicon donor portion, forming a first silicide forming metal slab abutting the silicon donor portion, forming a first cavity, a portion of the first cavity bounded by the first silicide forming metal slab, generating heat with the heating element, forming a first silicide slab from the first silicide forming metal slab using the generated heat and the silicon donor portion, and forming a passageway to the first cavity by forming the first silicide slab.

BRIEF DESCRIPTION OF THE DRAWINGS

FIG. 4 depicts a side cross sectional view of a support layer provided in accordance with a procedure that can be used to form the device of FIG. 1, with a heater element formed on an upper surface of the support layer;

FIG. 5 depicts a side cross sectional view of the device of FIG. 4 with an intermediate support layer formed on the upper surface of the heater element and support layer, wherein the intermediate support layer is silicon based;

FIG. 6 depicts a side cross sectional view of the device of FIG. 5 with a sacrificial slab formed on the intermediate support layer close to the heater element and with a sacrificial layer formed above the sacrificial slab and the intermediate support layer;

FIG. 7 depicts a side cross sectional view of the device of FIG. 6 with the sacrificial layer shaped to leave a remainder in the form of a desired chamber and abutting the sacrificial slab;

FIG. 8 depicts a side cross sectional view of the device of FIG. 7 with a cap layer formed on the intermediate support layer, about the remainder of the sacrificial layer, and about the sacrificial slab;

FIG. 9 depicts a side cross sectional view of the device of FIG. 8 with the cap layer etched to expose the remainder of the sacrificial layer;

FIG. 10 depicts a side cross sectional view of the device of FIG. 9 with the cap layer encapsulated and the remainder of the sacrificial layer etched to form a chamber abutting the sacrificial slab;

FIG. 11 depicts a side cross sectional view of the device of FIG. 10 with the cap layer shaped to expose a junction of the sacrificial slab and the cap layer, thereby providing a ready to use device with a chamber that is isolated by a single use valve;

DESCRIPTION

Figure 1:
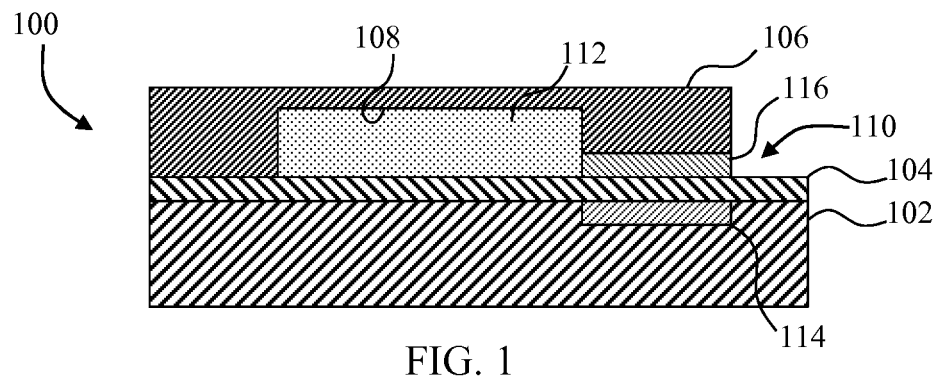
FIG. 1 depicts side cross sectional view of a MEMS device including a chamber that is isolated by a valve assembly in the form of a shrinkable pair and a heater element.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

FIG. 1 depicts a ready-to-use MEMS device 100 that include a substrate 102, an intermediate support layer 104, and a cap layer 106. The cap layer 106 defines a chamber 108 above the substrate 102 that is sealed by a valve assembly 110. Accordingly, a fluid 112, which may be a liquid or a gas, is maintained in the chamber 108.

The valve assembly 110 includes a heater element 114, a sacrificial material 116, and a donor portion of the intermediate support layer 104 which is located next to the sacrificial material 116. The heater element 114 may be in the form of a material which generates heat when exposed to a current or other form of energy. The shape of the heating element 114 may be modified to amplify heat generation. The sacrificial material 116 in one embodiment is a silicide forming material that exhibits volume shrinkage.

A silicide material is a material that reacts with silicon (Si) in the presence of heat to form a compound including the silicide forming material and silicon. Some common metals in this category include nickel (Ni), titanium (Ti), cobalt (Co), molybdenum (Mo), and platinum (Pt). "Volume shrinkage" is a phenomenon wherein the volume of a formed compound is less than the volume of the initial donor material and sacrificial material. Each of the metals identified above exhibit this phenomena when used to form a silicide. By way of example, when Ni is used as a silicide material in the presence of Si at a silicidation temperature of about 250° C., $Ni_2Si$ is formed. The $Ni_2Si$ compound occupies 23% less volume than the volume of the original Si and Ni material.

Thus, Ni and Si are a shrinkable pair. A "shrinkable pair" as that term is used herein is a combination of a donor material and a sacrificial material which can form a compound which exhibits volume shrinkage, resulting in a reduced volume slab. The term "donor material" means a material that provides structural support to the formed compound after a volume reducing process has been completed. The term "sacrificial material" means a material that does not provide structural support to the formed compound after a volume reducing process has been completed. In some embodiments, the donor material is present in such an amount that after the volume reducing process has been completed, at least some of the donor material remains while the sacrificial material is provided in such an amount that after the volume reducing process has been completed very little if any of the donor material remains. In other embodiments, two sacrificial materials may be used.

Accordingly, if Ni is selected as the sacrificial material 116 in the embodiment of FIG. 1, and the intermediate support layer 104 is made of a silicon based material, the sacrificial material 116 and the intermediate support layer 104 form a shrinkable pair with the intermediate support layer 104 being a donor material. Thus, by generating a temperature of 250° C. with the heating element 114, the sacrificial material 116 is consumed resulting in the configuration of FIG. 2.

Figure 2:
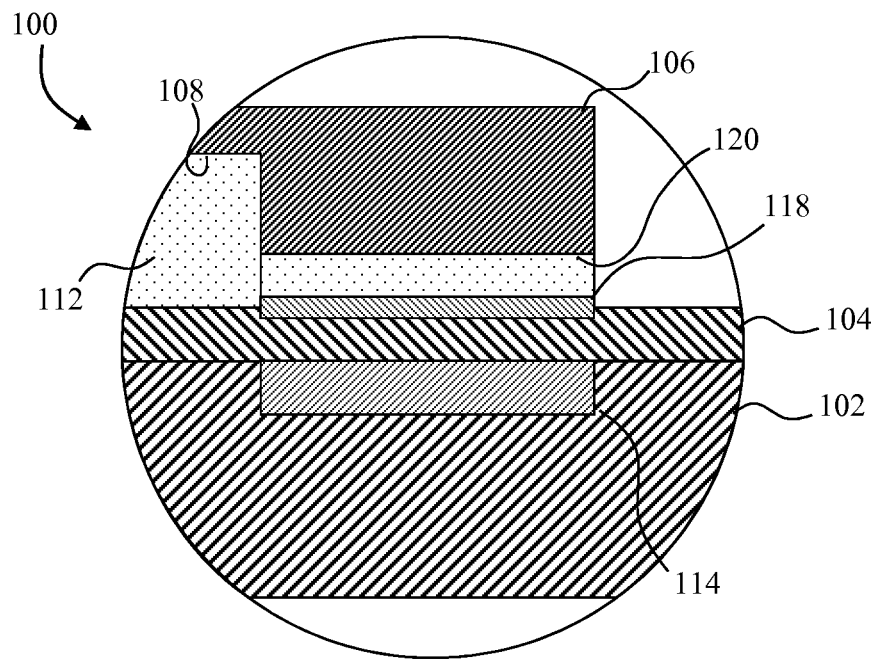
FIG. 2 depicts a partial cross sectional view of the device of FIG. 1 after the valve assembly has been operated by forming a silicide layer with the sacrificial material and the silicon donor material, the silicide material having a volume smaller than the volume of the sacrificial material and the silicon donor material resulting in a passageway to the chamber.

In FIG. 2, the sacrificial material 116 and the donor portion of the intermediate support layer 104 have been consumed to form a reduced volume slab of silicide material 118 of, e.g., $Ni_2Si$. The silicide material 118 is partially embedded within the intermediate support layer 104 and the reduction in volume of the silicide material 118 compared to the donor material in the original intermediate support layer 104 and sacrificial material 116 results in a passage 120 between the silicide material 118 and the cap layer 106. Consequently, the fluid 112 is allowed to move out of the chamber 108 through the passage 120.

The device 100 is thus "ready-to-use" in the configuration of FIG. 1 since all factory-related fabrication steps have been completed by time the device 100 is in the condition depicted in FIG. 1. Accordingly, the device 100 can be packaged, shipped, and stored for a desired amount of time prior to being placed into operation. Moreover, placing the device 100 into operation simply requires connecting the device 100 to any desired external circuitry and opening the chamber 108 by operation of the single use valve assembly 110 as described above. Until placed into operation, any fluid within the chamber 108 is protected from contamination. Likewise, any sensor (not shown) within the chamber 108 is maintained in a protective environment.

Figure 3:
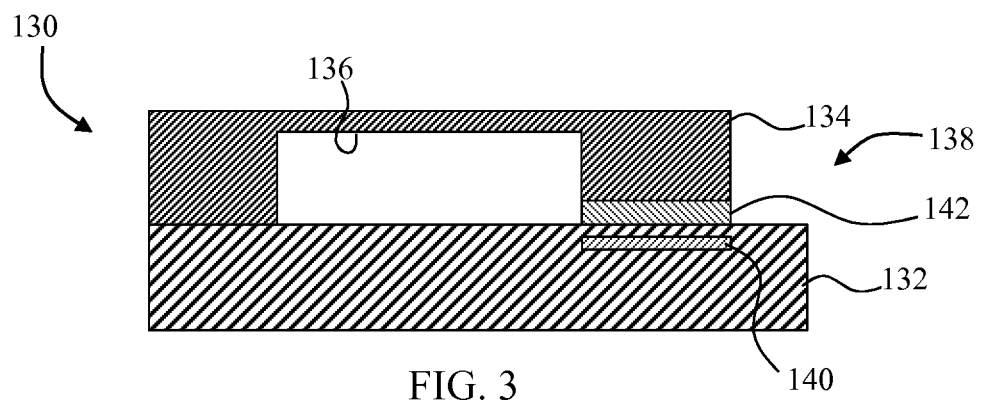
FIG. 3 depicts a side cross sectional view of a MEMS device including a chamber that is isolated by a valve assembly including a shrinkable pair and a heater element, wherein the chamber is maintained in a vacuum by the valve assembly.

While the embodiment of FIG. 1 includes a fluid 120 within the chamber 108, the chamber may alternatively be devoid of any material. By way of example, FIG. 3 depicts a device 130 incorporating a silicon based substrate 132 and a cap layer 134. The cap layer 134 defines a chamber 136 that is at a vacuum. The device 130 also includes a valve assembly 138. The valve assembly 138 includes a heater element 140 that is embedded within the substrate 132 while a sacrificial material 142 is formed on the upper surface of the substrate 132. The substrate 123 in this embodiment is silicon based, and thus provides a silicon donor portion. Vacuum filled embodiments may be useful in applications wherein a sensor (not shown) is located within the chamber 136. The sensor in such applications can be stored without significant degradation until such time as the sensor is placed into operation by opening of a passageway (not shown) using the valve assembly 138.

The devices of FIGS. 1 and 3 may be formed using known MEMS fabrication techniques. One process that may be used to form the device of FIG. 1 or, with slight modification, the device of FIG. 3, is described with reference to FIGS. 4-11.

With initial reference to FIG. 4, the fabrication process begins by providing a support layer (150). In one embodiment, the support layer is a planar surface. A heating element 152 is then positioned on the support layer. The heating element 152 may be deposited on the support layer 150 using any desired process such as lithography. An intermediate support layer 154 is then formed on the substrate 150 and the heating element 152 and planarized (FIG. 5). In this example, the intermediate support layer 154 is selected to provide silicon in a silicidation process.

Next, a sacrificial material 156 and a sacrificial layer 158 are formed on the upper surface of the intermediate support layer 154 (FIG. 6). The length and thickness of the sacrificial material 156 may be selected to provide a desired passage size. As used herein, "thickness" is the dimension along an axis perpendicular to a plane defined by the junction of a sacrificial material or slab and a donor silicon layer or slab. "Length" is the dimension along an axis in the plane that is parallel to a boundary between a chamber and the sacrificial material or slab, and "width" is the dimension along an axis in the plane perpendicular to the length axis. Thus, with reference to FIG. 6, thickness is the vertical dimension of the sacrificial material 156, width is the horizontal dimension of the sacrificial material 156, and length is the dimension of the sacrificial material 156 measured into and out of the page.

While virtually any length may be used, the thickness of the sacrificial material 156 will typically be based upon a desired passageway height since the difference in height between a silicide forming material and the silicide material is readily available. The width of the sacrificial material 156 may be selected to ensure that the chamber will remain sealed until silicidation.

After the sacrificial layer 158 is formed on the upper surface of the intermediate support layer 154 and the upper surface of the sacrificial material 156, the sacrificial layer 158 is shaped as depicted in FIG. 7 so that a remainder of the sacrificial layer 158 abutting the sacrificial material 156 is the desired dimensions of the final chamber. In FIG. 7, the upper surface of the sacrificial material 156 and a portion of the upper surface of the intermediate support layer 154 are exposed.

Next, a cap layer 160 is formed on the remainder of the sacrificial layer 158, the upper surface of the sacrificial material 156 and the exposed portion of the intermediate support layer 154 (FIG. 8). Referring to FIG. 9, etch holes 162 are then formed in the cap layer 160 to expose the remainder of the sacrificial layer 158. The remainder of the sacrificial layer 158 is then etched and the etch holes are filled resulting in the configuration of FIG. 10 wherein the cap layer 160 encapsulates a chamber 164.

The cap layer 160 is then etched to expose a portion of the sacrificial material 156 (FIG. 11). Depending upon the desired atmosphere within the chamber 164, the atmosphere may be established during encapsulation or after encapsulation. Once the desired atmosphere is effected within the chamber 164 and a junction of the sacrificial material 156 and the cap layer 160 is exposed, the device is "ready to use".

Figure 12:
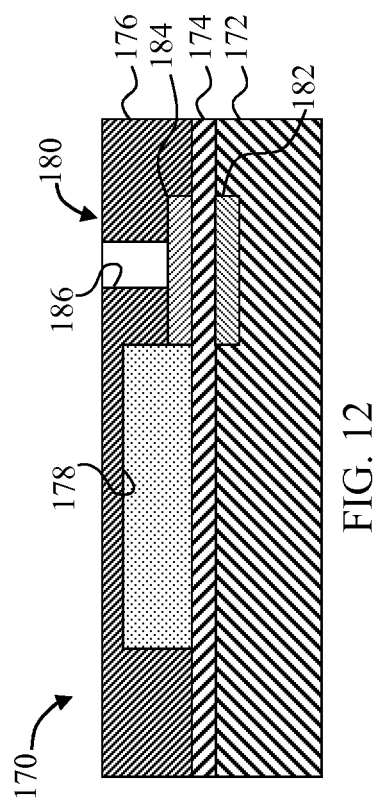
FIG. 12 depicts a side cross sectional view of a MEMS device including a chamber that is isolated by a valve assembly including a shrinkable pair and a heater element, wherein a trench exposes a junction of the sacrificial slab and the cap layer, thereby providing a ready to use device with a chamber that is isolated by a single use valve.

In FIG. 11 a side portion of the sacrificial material 156 is exposed to allow for communication of the chamber through a passage formed by the single use valve assembly and another area. In other embodiments an upper surface portion of the sacrificial material 156 may be exposed. By way of example, FIG. 12 depicts a device 170 incorporating a substrate 172, a silicon based intermediate support layer 174, and a cap layer 176. The cap layer 176 defines a chamber 178. The device 170 also includes a valve assembly 180. The valve assembly 180 includes a heater element 182 that is embedded within the substrate 172 while a sacrificial material 184 is formed on the upper surface of the intermediate support layer 174. The valve assembly 180 also includes a donor portion of the intermediate support layer 174 located between the heater element 182 and the sacrificial material 184.

Figure 13:
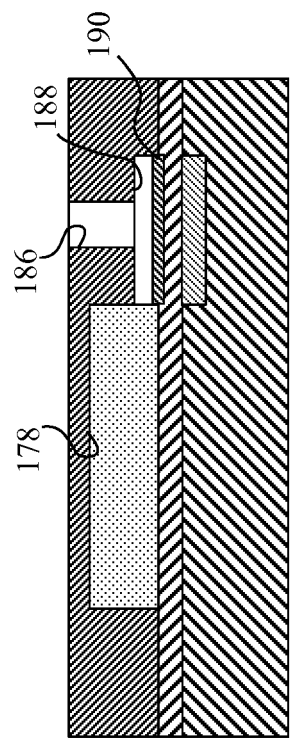
FIG. 13 depicts a cross sectional view of the device of FIG. 12 after the valve assembly has been operated by forming a silicide layer with the sacrificial material and the silicon donor material, the silicide material having a volume smaller than the volume of the sacrificial material and the silicon donor material resulting in a passageway between the trench and the chamber.

The device 170 further includes a trench 186 that extends through the cap layer 176 to the upper surface of the sacrificial material 184. The trench 186 may be formed, for example, by DRIE. Accordingly, as silicidation of the sacrificial material 184 occurs, the sacrificial material 184 and the formed silicide consolidate toward the source of the donor silicon, the intermediate support layer 174, resulting in the configuration of FIG. 13. In FIG. 13, a passageway 188 has been formed between the chamber 178 and the trench 186 above a silicide layer 190.

Figure 14:
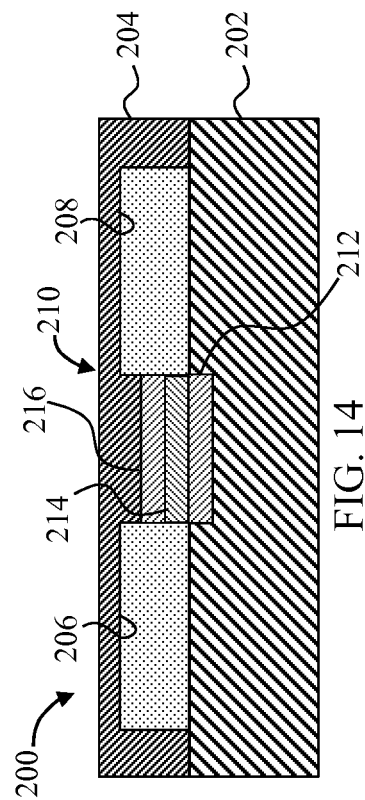
FIG. 14 depicts a side cross sectional view of a MEMS device with an array including two horizontally spaced apart chambers that are isolated by a valve assembly including a shrinkable pair and a heater element, thereby providing a ready to use device with a two chambers that are isolated from each other by a single use valve.

While the foregoing embodiments incorporated a valve assembly configured to form a passageway between a chamber and an area outside of the device, other configurations are possible. One such alternative is depicted in FIG. 14. FIG. 14 depicts an embodiment wherein a device 200 includes a substrate 202 and a cap layer 204. The cap layer 204 defines a chamber 206 and a chamber 208. The device 200 also includes a valve assembly 210. The valve assembly 210 includes a heater element 212 that is embedded within the substrate 202, a silicon based donor slab 214 formed on the upper surface of the heater element 212, and a sacrificial material 216 formed on the upper surface of the silicon based donor slab 214.

Figure 15:
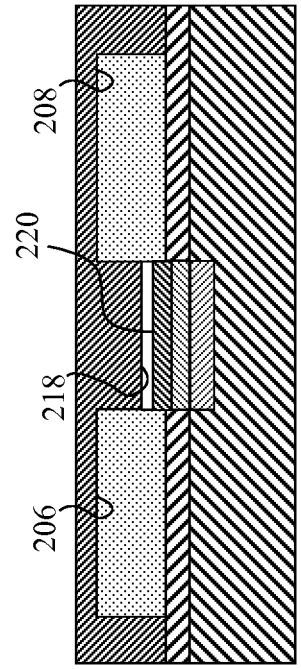
FIG. 15 depicts a cross sectional view of the device of FIG. 14 after the valve assembly has been operated by forming a silicide layer with the sacrificial material and the silicon donor material, the silicide material having a volume smaller than the volume of the sacrificial material and the silicon donor material resulting in a passageway between the two chambers.

Accordingly, as silicidation of the sacrificial material 216 occurs, the sacrificial material 216 and the formed silicide consolidate toward the source of the silicon which supports the silicide, the silicon based donor slab 214, resulting in the configuration of FIG. 15. In FIG. 15, a passageway 218 has been formed between the chamber 206 and the chamber 208 above a silicide layer 220.

Figure 16:
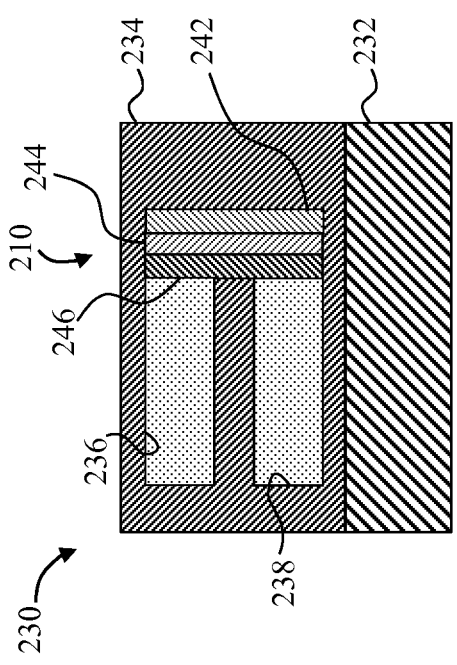
FIG. 16 depicts a side cross sectional view of a MEMS device including an array of two chambers that are isolated by a vertical valve assembly including a shrinkable pair and a heater element, thereby providing a ready to use device with two vertically spaced apart chambers that are isolated from each other by a single use valve.

While the foregoing embodiments have incorporated valve assemblies configured to provide horizontal passageways, valve assemblies which provide vertical passageways are also possible as depicted in FIG. 16. FIG. 16 depicts an embodiment wherein a device 230 includes a substrate 232 and a cap layer 234. The cap layer 234 defines a chamber 236 and a chamber 238. The device 230 also includes a valve assembly 240. The valve assembly 240 includes a heater element 242 that is embedded within the cap layer 234, a silicon based donor slab 244 formed within the cap layer 234, and a sacrificial material 246 adjacent to the silicon based donor slab 244.

Figure 17:
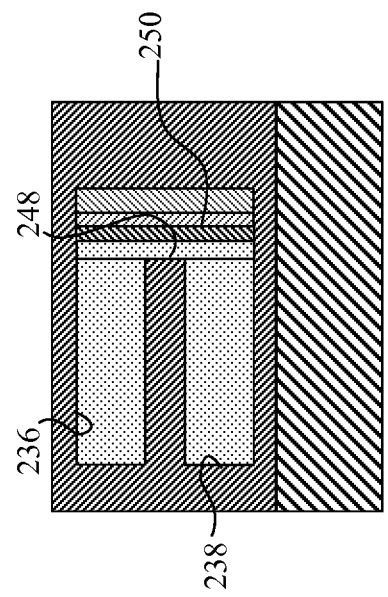
FIG. 17 depicts a cross sectional view of the device of FIG. 16 after the valve assembly has been operated by forming a silicide layer with the sacrificial material and the silicon donor material, the silicide material having a volume smaller than the volume of the sacrificial material and the silicon donor material resulting in a passageway between the two chambers.

Accordingly, as silicidation of the sacrificial material 246 occurs, the sacrificial material 246 and the formed silicide consolidate toward the source of the donor silicon, the silicon based donor slab 244, resulting in the configuration of FIG. 17. In FIG. 17, a passageway 248 has been formed between the chamber 236 and the chamber 238 above a silicide layer 250. Accordingly, fluids within the chambers 236/238 are allowed to mix.

The various configurations, embodiments, and features discussed herein may be combined in a variety of ways depending upon the desired application. The single use valves disclosed herein may thus be incorporated into lab-on-chip devices, chemical sensors, gas-sensors and arrays, drug-delivery devices (release of micro-particles), devices for release of autonomous sensors (e.g. array of disposable one-time-sensors) into the environment, etc. The single use valves disclosed herein allow for valve operation using a dry process that is contamination free, chemical free and which exhibits reduced potential for stiction. These advantages are accomplished by a configuration that allows for rapid valve operation.

By incorporation of the single use valves disclosed herein, sensitive MEMS components may be protected during processing, packaging, shipping, and storing of a device. When the device is to be placed into operation, the protective chamber can be easily opened. The size of the opening to a chamber can be selected based upon operational considerations with gap thicknesses of up to 10 μm and virtually any desired length possible. Opening of ports may be accomplished simultaneously or in a staged manner. Staged opening may be accomplished by selective use of heating elements. Additionally and/or alternatively, silicide forming materials exhibiting different silicidation temperatures may be incorporated into a device and selective opening accomplished by temperature control.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A method of opening a passageway to a cavity comprising:
   providing a donor portion;
   forming a heating element adjacent to the donor portion;
   forming a first sacrificial slab abutting the donor portion, wherein the donor portion and the sacrificial slab are a shrinkable pair;
   forming a first cavity, a portion of the first cavity bounded by the first sacrificial slab;
   generating heat with the heating element;
   forming a first reduced volume slab from the first sacrificial slab using the generated heat and the donor portion; and
   forming a passageway to the first cavity by forming the first reduced volume slab.

2. The method of claim 1, wherein forming a passageway comprises:
   forming a passageway between the first cavity and a second cavity.

3. The method of claim 1, further comprising:
   forming an upper layer above the first sacrificial slab; and
   exposing a portion of the first sacrificial slab with a trench through the upper layer, wherein forming a passageway comprises forming a passageway between the first cavity and the trench.

4. The method of claim 1, further comprising:
   forming a first electrode operably connected to a first portion of the heating element; and
   forming a second electrode operably connected to a second portion of the heating element, wherein generating heat comprises applying a potential across the first electrode and the second electrode.

5. The method of claim 1, further comprising:
   forming a second sacrificial slab;
   forming a second cavity, a portion of the second cavity bounded by the second sacrificial slab;
   forming a second reduced volume slab from the second sacrificial slab; and
   forming a passageway to the second cavity by forming the second reduced volume slab.

6. The method of claim 1, wherein:
   providing a donor portion comprises forming a silicon based support layer.

7. A ready-to-use MEMS device comprising:
   a silicon based donor portion;
   a first cavity defined by a first boundary in the MEMS device;
   a first silicide forming metal portion abutting the silicon based donor portion, the first silicide forming metal portion forming a portion of the first boundary; and
   a heating element adjacent to the first silicide forming metal portion.

8. The ready-to-use MEMS device of claim 7, wherein:
   the first cavity is formed above a first portion of a support layer;
   the heating element is formed below a second portion of the support layer;
   the first silicide forming metal portion is formed above the second portion of the support layer; and
   the second portion of the support layer includes the silicon based donor portion.

9. The ready-to-use MEMS device of claim 8, further comprising:
   a first electrode operably connected to a first portion of the heating element; and
   a second electrode operably connected to a second portion of the heating element.

10. The ready-to-use MEMS device of claim 7, wherein the first cavity is filled with a fluid.

11. The ready-to-use MEMS device of claim 7, further comprising:
    a sensor element exposed to the first cavity.

12. The ready-to-use MEMS device of claim 7, further comprising:
a second cavity defined by a second boundary in the MEMS device, wherein the first silicide forming metal portion forms a portion of the second boundary.

13. The ready-to-use MEMS device of claim 7, further comprising:
a second cavity defined by a second boundary in the MEMS device; and
a second silicide forming metal portion adjacent to the silicon based portion and forming a portion of the second boundary.

14. The ready-to-use MEMS device of claim 13, wherein:
the first silicide forming metal portion has a first silicidation temperature;
the second silicide forming metal portion has a second silicidation temperature; and
the first silicidation temperature is hotter than the second silicidation temperature.

15. A method of opening a passageway to a cavity comprising:
providing a silicon donor portion;
forming a heating element adjacent to the silicon donor portion;
forming a first silicide forming metal slab abutting the silicon donor portion;
forming a first cavity, a portion of the first cavity bounded by the first silicide forming metal slab;
generating heat with the heating element;
forming a first silicide slab from the first silicide forming metal slab using the generated heat and the silicon donor portion; and
forming a passageway to the first cavity by forming the first silicide slab.

16. The method of claim 15, wherein forming a passageway comprises:
forming a passageway between the first cavity and a second cavity.

17. The method of claim 15, further comprising:
forming an upper layer above the first silicide forming metal slab; and
exposing a portion of the first silicide forming metal slab with a trench through the upper layer, wherein forming a passageway comprises forming a passageway between the first cavity and the trench.

18. The method of claim 15, further comprising:
forming a first electrode operably connected to a first portion of the heating element; and
forming a second electrode operably connected to a second portion of the heating element, wherein generating heat comprises applying a potential across the first electrode and the second electrode.

19. The method of claim 15, further comprising:
forming a second silicide forming metal slab;
forming a second cavity, a portion of the second cavity bounded by the second silicide forming metal slab;
forming a second silicide slab from the second silicide forming metal slab; and
forming a passageway to the second cavity by forming the second silicide slab.

20. The method of claim 15, wherein:
providing a silicon donor portion comprises forming a silicon based support layer.

* * * * *